M. CLARK, DEC'D.
E. B. CLARK, EXECUTRIX.
VEHICLE WHEEL TIRE.
APPLICATION FILED FEB. 27, 1918. RENEWED FEB. 10, 1922.
1,427,092.
Patented Aug. 29, 1922.
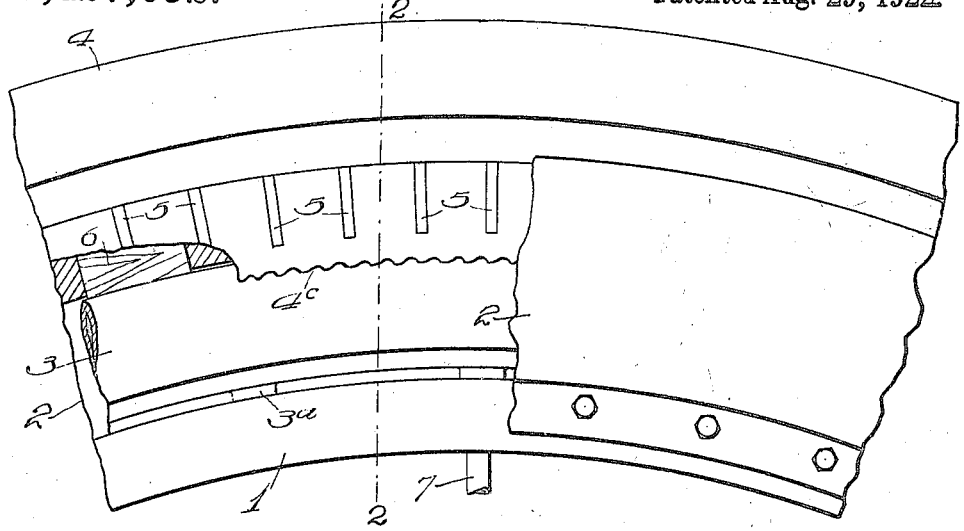
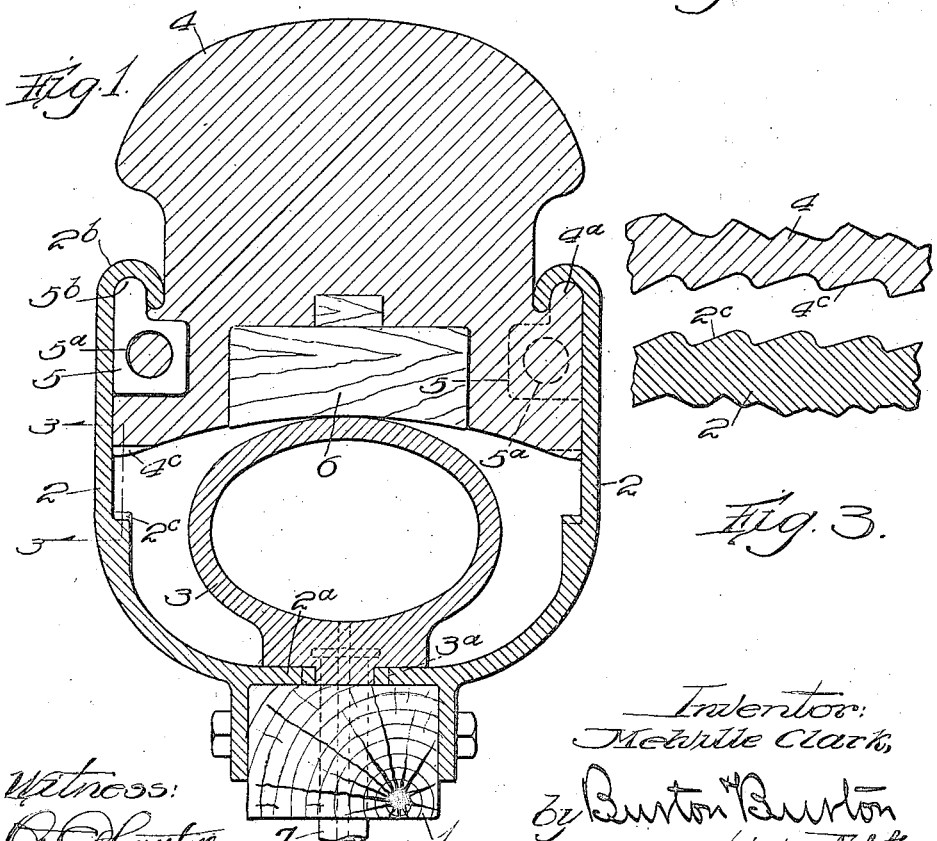

UNITED STATES PATENT OFFICE.

MELVILLE CLARK, OF CHICAGO, ILLINOIS; ELIZABETH B. CLARK EXECUTRIX OF SAID MELVILLE CLARK, DECEASED, ASSIGNOR, BY MESNE ASSIGNMENTS, OF ONE-HALF TO WILLIAM ANNAN TAYLOR, OF CHICAGO, ILLINOIS, AND ONE-HALF TO CHARLES S. BURTON, OF OAK PARK, ILLINOIS.

VEHICLE-WHEEL TIRE.

1,427,092.  Specification of Letters Patent.  Patented Aug. 29, 1922.

Application filed February 27, 1918, Serial No. 219,378. Renewed February 10, 1922. Serial No. 535,612.

*To all whom it may concern:*

Be it known that I, MELVILLE CLARK, a citizen of the United States, residing at Chicago, in the county of Cook and State of Illinois, have invented certain new and useful Improvements in Vehicle-Wheel Tires, of which the following is a specification, reference being had to the accompanying drawings, forming a part thereof.

The purpose of this invention is to provide an improved construction of a combined cushion and pneumatic tire for a vehicle wheel. It consists in the elements and features of construction shown and described, as indicated in the claims.

In the drawings:—

Figure 1 is a section radial with respect to the wheel and transverse with respect to the tire of a wheel equipped with a tire embodying this invention on the line 2—2 on Fig. 2.

Figure 2 is a fragmentary side view, the pneumatic tube or air spring being partly broken away to disclose the detail features of the construction of a tread and lateral guard.

Figure 3 is a section at the line, 3—3, on Figure 1.

In the structure shown in the drawings, 1 is the felly of a vehicle wheel. 2, 2, are lateral metal guards or flanges bound upon opposite sides of the felly and forming between them a seat in which there is embraced a pneumatic tube or air spring, 3, seating on the flanges, 2ª, of the guards which directly encompass the felly, and the tread member, 4, which is closely embraced by the guard and seats upon the outer circumference of the air spring. The guards have at their outer circumferences each an inturned hook flange, 2ᵇ, and the tread member, 4, is formed with circumferentially-extending lips, 4ª, projecting in planes transverse to the axis and adapted to engage within the in-turned hook flanges, 2ᵇ, of the lateral guards. Embedded in the tread member, 4, at short intervals throughout its circumference on both sides are metal plates, 5, each having an aperture, 5ª, in the body, and a projection, 5ᵇ, corresponding in form to a cross-section of the lip, 4ª, of the tread member. These plates, 5, are embedded as shown, so that the projections, 5ᵇ, extend into and, in fact, form a part of the lips 4ª, of the tread member for reinforcing the latter both to prevent them from being too easily bent or sprung outward, and also to save them the wear of frictional engagement with the interior surfaces of the hook flanges, which is effectively done by making the plates, 5, of such dimensions that their outer edges are flush with the outer surface of the tread member, and the entire edge of the projection, 5ᵇ, is flush with the surface of the lip, 4ª. It will be understood that in molding the tread member the rubber substance of the latter extends through the apertures, 5ª, of the plates, 5, and thereby these plates are securely locked in the substance of the tread. In the inner circumference of the tread member, 4, there are embedded so as to be securely held, wooden blocks, 6, placed at short intervals throughout the entire circumference of said tread member, and forming by their inner surfaces the seating surface,—or the greater part of the seating surface,—of the tread member upon the outer circumference of the pneumatic tube or air spring, 3. Preferably these blocks are paraffine-saturated and according to experience they defeat any substantial abrasion of the air spring in the rubbing that may take place between the tread member and the air spring and prevent any heating of either of said members, such as would occur in the rubbing together of two rubber substances.

The tread member with its embedded parts, 5 and 6, is free to move circumferentially between the guards and about the air spring, except to the extent that such movement is prevented or retarded by the friction of the engagement of the tread member between the guards and particularly of the engagement of the lips, 4ª, in the in-turned hook flanges, 2ᵇ, of the guard, this frictional engagement being rendered very substantial when the air spring is strongly inflated and being at all times sufficient to prevent any but slight creeping movement of the tread member around the wheel between the guards and upon the inner pneumatic tube or air spring. It will be understood that the latter is prevented from creeping by its engagement with the guards by the bosses, 3ª, on the inner circumference of said tube as fully set out in my Patent No. 1,135,258, and also with the felly as a point where the inflating tube, 7, is secured in the usual manner at the inner circumference of the air spring and extends out through the guards and felly for receiving the pump connection or the cap closing it after the tube had been inflated. The air spring thus constitutes a fixed seat upon which the tread member may travel as it creeps around the wheel more or less, due to traction on the road-way.

When the air spring is deflated by any cause the tread member is prevented from being forced radially inward by the load beyond a certain short distance and is prevented from crushing and injuring the deflated air tube, by the provision of a shoulder, $2^c$, upon each of the lateral guards, 2, projecting inwardly and facing radially outwardly at a short distance inward from the inner circumference of the tread member when the latter is normally seated with its lips, $4^a$, engaged in the hook flanges, $2^b$; and the tread member can therefore move inward only this short distance at the most when the support of the air spring is lost by the latter becoming deflated. The wheel can thus be used in travel of the vehicle effectively, without the support of the air spring, the tread member operating as a simple cushion tire, and cushioning the vehicle by the elasticity of said tread member alone pressing against the shoulders, $2^c$, as the load forces the tread member inward. Under these circumstances, something of the frictional restraint of the engagement of the lip of the tread member with the hook flanges of the guard for preventing creeping is lost, and to make good this loss and still prevent undue creeping of the tread member the shoulders, $2^c$, of the lateral guard are corrugated as seen in Figure 3, and the inner circumferential edge portions of the tread member are correspondingly corrugated at $4^c$ so that when the tread member is forced inward to the shoulders, $2^c$, the corrugations of the shoulders and those of the tread member become engaged and serve as a resistance to the creeping.

I claim:—

1. A vehicle wheel tire comprising in combination with lateral guards secured at opposite sides of the felly; a cushioning tread member positioned between the guards and extending from guard to guard, the guard and the tread member having interlocking circumferentially-extending tongue-and-groove features of which those of the guard are exterior to those of the tread for retaining the tread between the guards against radial escape; the tread member being free to creep about the wheel axis between the guards relatively thereto, the guards and their interlocking features being closely fitted to the tread member to frictionally resist and retard such relative creeping movement; the guards having circumferential inwardly-turned hook flanges, and the tread member having lips at opposite sides extending circumferentially and projecting in planes transverse to the wheel axis for engaging the hook flanges of the guards; metal plates embedded in the tread member, positioned in radial planes, having projections extending inwardly for reinforcing the latter, and having apertures in the body portion through which the substance of the tread member extends for holding the plate securely positioned; a pneumatic tube or air spring enclosed by the guards in the tread member, and forming an inner seat and track for said tread member, and means for securing the air spring against creeping around the axis.

2. A vehicle wheel tire comprising in combination with lateral guards secured at opposite sides of the felly; a cushioning tread member positioned between the guards and extending from guard to guard, the guard and the tread member having interlocking circumferentially-extending tongue-and-groove features of which those of the guard are exterior to those of the tread for retaining the tread between the guards against radial escape; the tread member being free to creep about the wheel axis between the guards relatively thereto, the guards and their interlocking features being closely fitted to the tread member to frictionally resist and retard such relative creeping movement; the guards having each an inwardly-projecting annular shoulder facing outwardly from the axis, and a tread member having at each side an inwardly-facing annular shoulder for seating on the shoulder of the guards when the tread is forced radially inward under said load at a certain distance, said shoulders of the guard and tread member respectively, being corrugated for engaging one with the other, to resist the creeping movement of the tread about the felly; a pneumatic tube or air spring enclosed by the guards and the tread member, and forming an inner seat and track for the creeping movement of said tread member, and means for securing the air spring against creeping around the axis.

In testimony whereof, I have hereunto set my hand at Chicago, Illinois, this 21st day of February, 1918.

MELVILLE CLARK.